Sept. 13, 1932.  J. B. MENZL  1,877,004
APPARATUS FOR FORMING METALLIC RETAINING MEMBERS
Filed April 19, 1927   6 Sheets-Sheet 1

Sept. 13, 1932. J. B. MENZL 1,877,004
APPARATUS FOR FORMING METALLIC RETAINING MEMBERS
Filed April 19, 1927 6 Sheets-Sheet 2

Inventor
John B. Menzl.
Lewis Hudson & Kent
Attys

Sept. 13, 1932. J. B. MENZL 1,877,004
APPARATUS FOR FORMING METALLIC RETAINING MEMBERS
Filed April 19, 1927   6 Sheets-Sheet 3
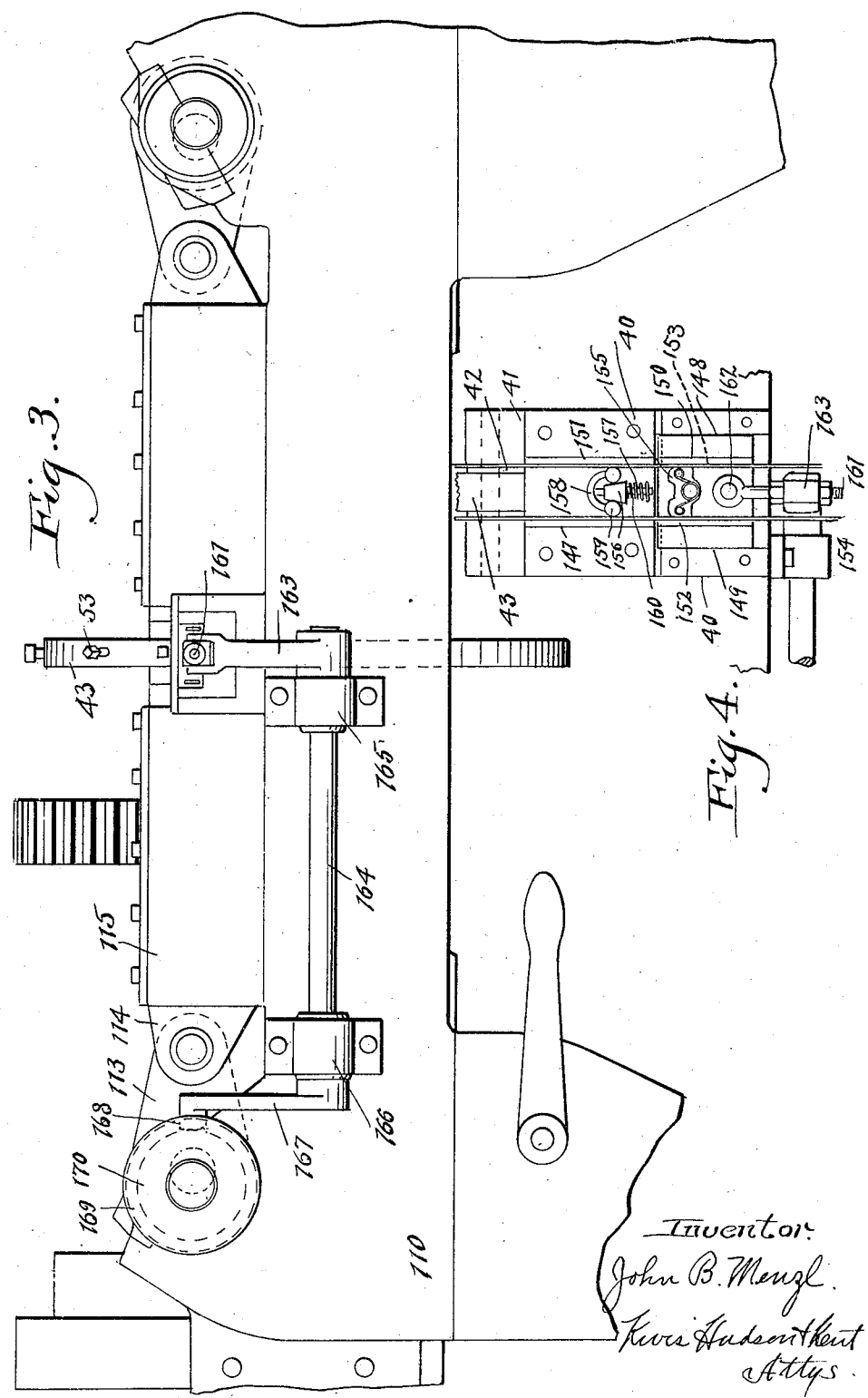

Sept. 13, 1932.  J. B. MENZL  1,877,004
APPARATUS FOR FORMING METALLIC RETAINING MEMBERS
Filed April 19, 1927  6 Sheets-Sheet 4
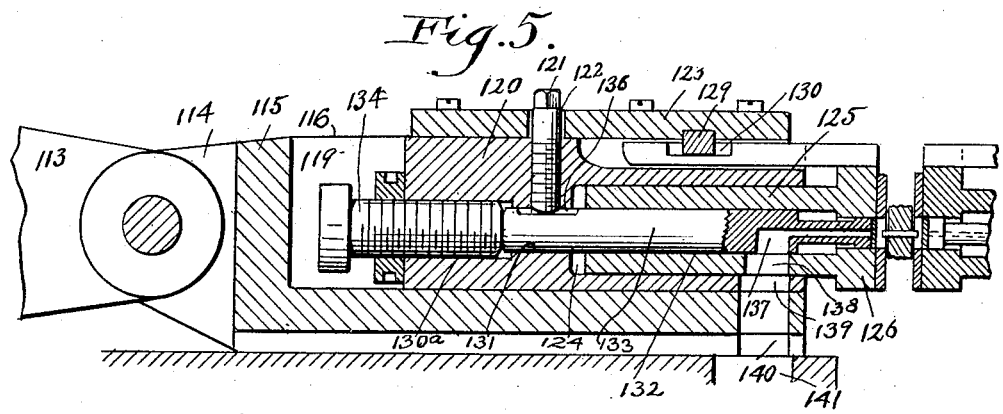
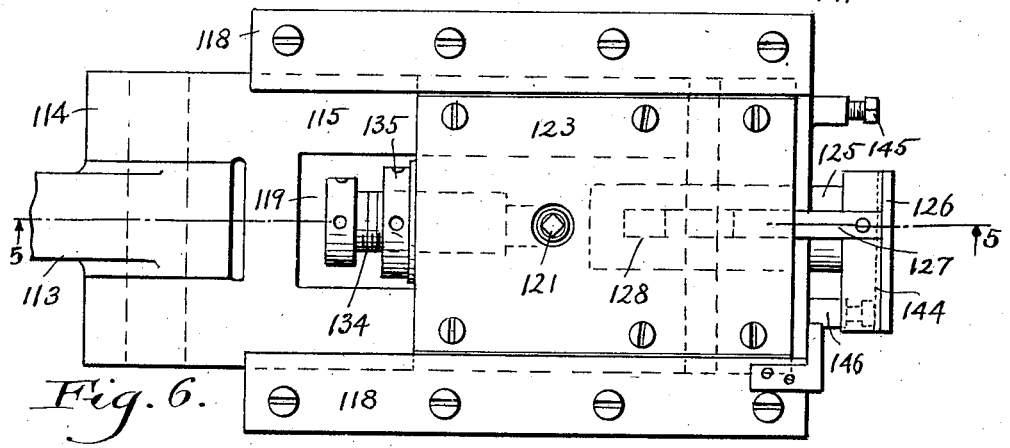
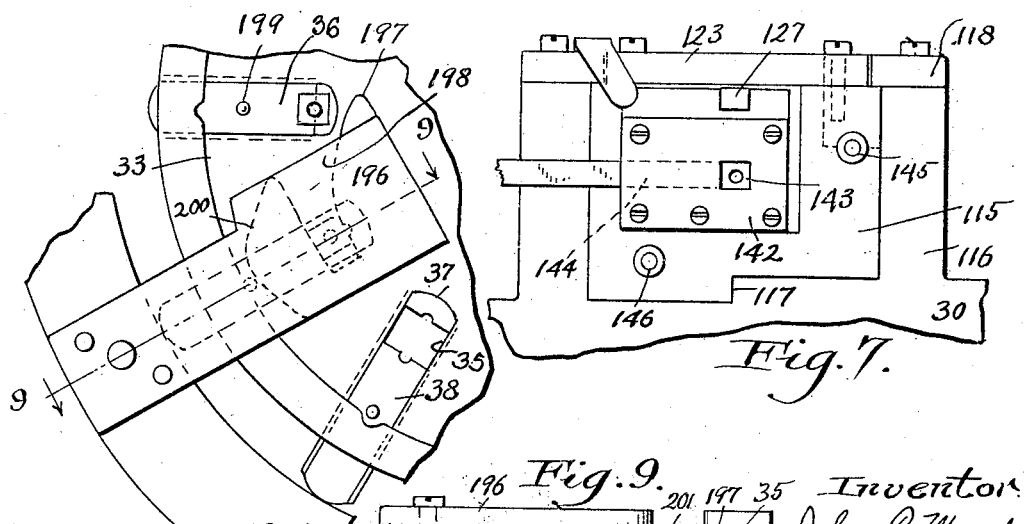
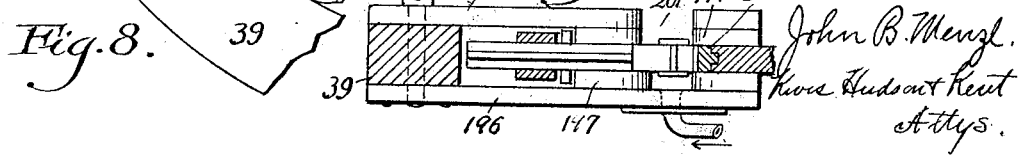

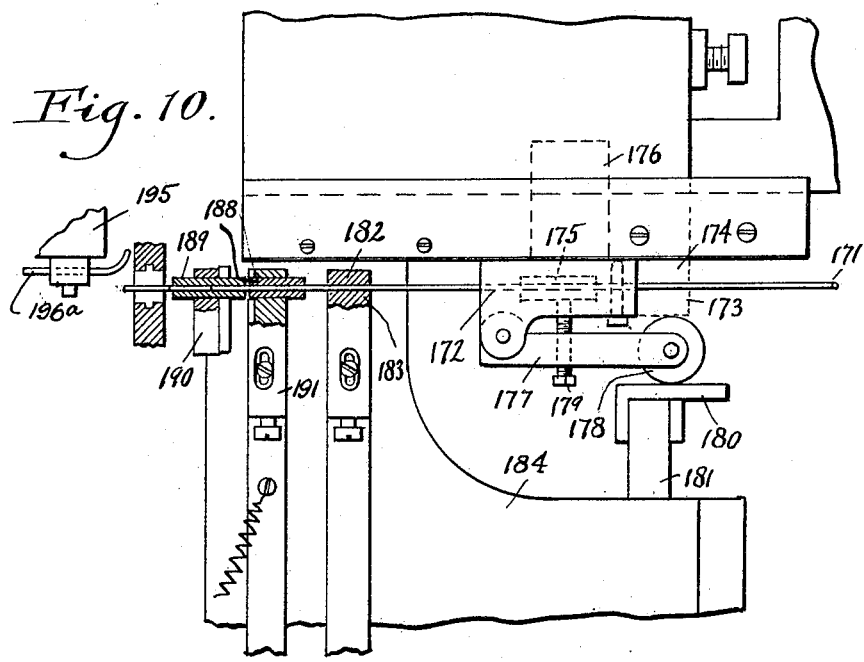

Sept. 13, 1932.  J. B. MENZL  1,877,004
APPARATUS FOR FORMING METALLIC RETAINING MEMBERS
Filed April 19, 1927   6 Sheets-Sheet 6

Inventor.
John B. Menzl.
Kwok Hudson + Kent
Attys

Patented Sept. 13, 1932

1,877,004

UNITED STATES PATENT OFFICE

JOHN B. MENZL, OF CLAYTON, OHIO, ASSIGNOR TO THE FANNER MANUFACTURING COMPANY, OF CLEVELAND, OHIO, A CORPORATION OF OHIO

APPARATUS FOR FORMING METALLIC RETAINING MEMBERS

Application filed April 19, 1927. Serial No. 185,052.

This invention relates to a machine for and the method of forming metallic retaining members, and more particularly chaplets, for use in supporting a core within a mold.

It is well known that chaplets have to be exceptionally accurate for the use for which they are employed and because they are only used once, due to the fact that they become a part of the cast article, the cost of production is a very important element. It is, therefore, one of the objects of the present invention to provide a machine which will automatically turn these chaplets out in great quantities thereby reducing the manufacturing cost, but at the same time produce chaplets which do not vary in measurement to any appreciable extent.

It is very important that chaplets used for supporting the core within the mold, prior to pouring the molten metal into the mold, should be so constructed that they will not be weakened by the heat from the metal until it has sufficiently filled the space between the mold and core and will, therefore, support the core without the assistance of the chaplets. Since the chaplets are fused with the metal of the casting it is of importance that these chaplets be manufactured as cheaply as possible.

A still further object of the invention resides in the provision of a machine and method by which the attached heads are securely fixed to the stem and each head supported by a shoulder formed upon each end of the stem which is of sufficient thickness to be unaffected by the heat of the molten metal, so that the head will not become loose on the stem and permit the core to settle in the mold before there is sufficient metal in the mold to support the core.

Another object of the invention is to provide a machine and method for forming chaplets having oppositely disposed heads and a stem therebetween which comprises a means for forming shoulders at each end of the stem, piercing and cutting the heads and positioning them upon the stem in engagement with the shoulders and finally riveting the heads to the stem tightly against the shoulders. The particular feature of this method resides in the fact that these operations are taking place simultaneously, that is, the shoulders are being upset on the stem by one set of dies, while the heads are being pierced and positioned on a stem on which the shoulders have already been upset, and the heads are being riveted to another stem upon which the heads have already been positioned upon the stem. As a matter of fact, it might be said that there are three chaplets being operated on at one time.

It is of exceptional importance that the shoulders should be formed or upset as the first step of the three above enumerated. This produces a much better support for the heads than in the case where the heads are riveted to the stem simultaneously with the forming of the shoulder. In the latter case it has been found from actual production that the opening in the head through which the stem extends is considerably distorted or enlarged upon the operation of riveting and forming the shoulder simultaneously and that the heat from the molten metal melts this thin portion around the stem and causes the head to slip down upon the stem thereby permitting the stem to enter the said core and therefore not to function as a support as is intended.

With the objects above indicated and other objects hereinafter explained in view, my invention consists in the apparatus and method hereinafter described and claimed.

Referring to the drawings:

Fig. 3 is a rear elevational view of the machine.

Fig. 4 is a fragmentary top plan view showing in detail the metal tape feeding mechanism.

Fig. 5 is a longitudinal sectional view of the die mechanism taken on line 5—5 of Fig. 6.

Fig. 6 is a top plan view of the same.

Fig. 7 is a front elevational view of the die mechanism, as shown in Fig. 6.

Fig. 8 is a fragmentary elevational view of a portion of the rotary disk showing the means for separating the two part die and ejecting the chaplet.

Fig. 9 is a cross sectional view taken on line 9—9 of Fig. 8.

Fig. 10 is a fragmentary view partly in section showing the cutting means, gripping means and wire feeding means.

Fig. 11 is a view showing the stem which has been cut to size.

Fig. 12 shows the position of the shoulders upset on the stem in Fig. 11.

Fig. 13 shows the position of the heads with respect to the shoulders and stem.

Fig. 14 shows the heads after they have been riveted to the stem.

Fig. 15 is a fragmentary cross sectional view through the disk and die in the operation of forming the shoulders.

Fig. 16 is a fragmentary cross sectional view through the disk showing the heads riveted to the stem.

Fig. 17 is a plan view of the gearing between the drive shaft and the cam shaft.

Figure 1:
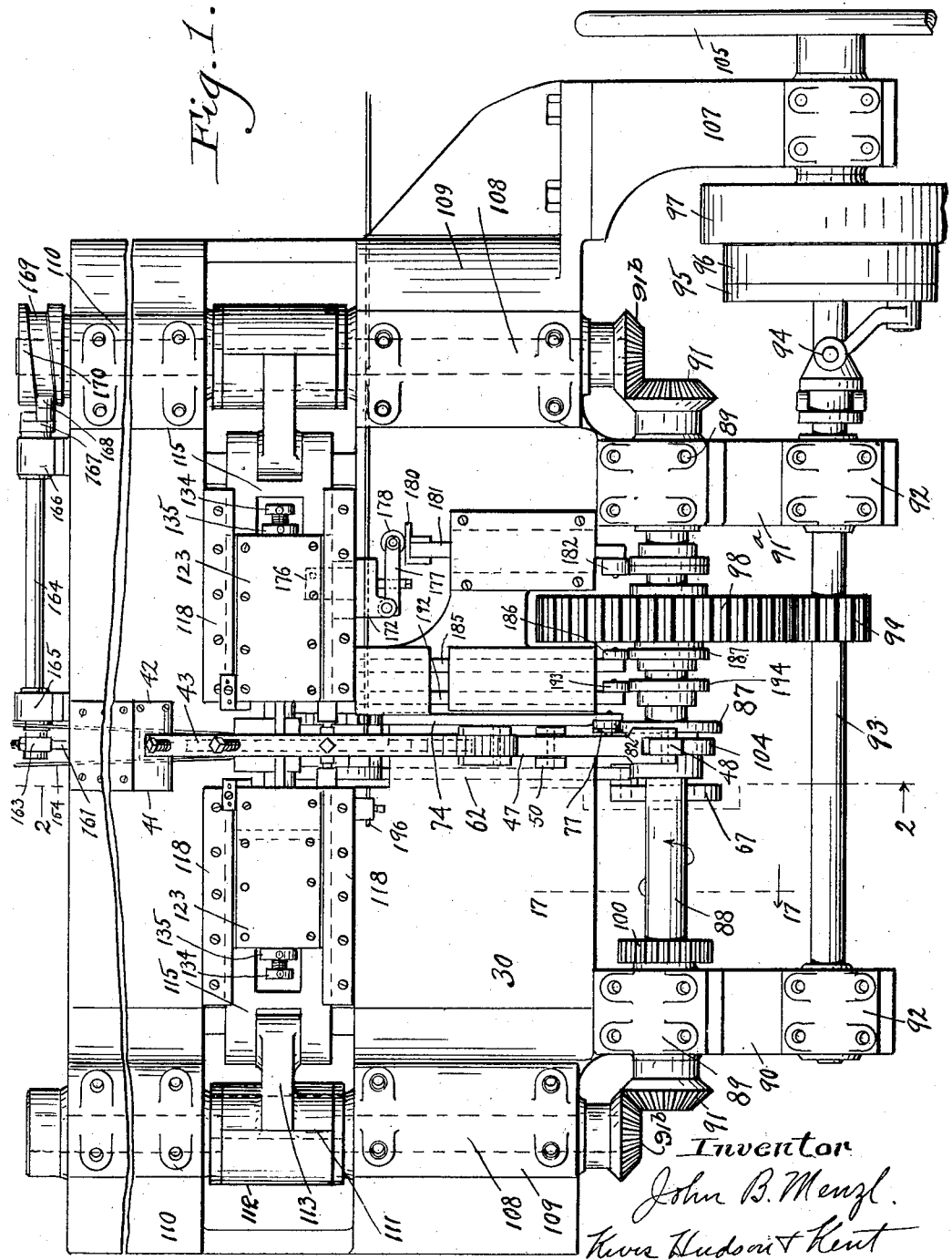
Fig. 1 is a top plan view of the machine.

In the drawings there has been shown in Figs. 11, 12, 13 and 14, the various steps necessary in forming the chaplet. Fig. 11 shows the stem $a$ which has been cut off from the wire fed into the machine as representing the first step in the method. Fig. 12 shows the stem $a$ provided with shoulders $b$ which have been upset near the outer ends of the stem and being the second step. Fig. 13 shows the heads $c$ which have been pierced by the stem, resting against the shoulders $b$ and having a portion of the stem $a$ extending beyond the outer surfaces of the head $c$ and constituting the third step in the method. Fig. 14 shows the finished chaplet wherein the extended ends of the stem $a$ have been securely riveted to the heads $c$ tightly against the shoulder $b$. It should be understood that these steps in the method are being performed simultaneously so that as a matter of fact three chaplets are being worked upon at the same time and that the machine for forming these chaplets is so arranged and timed that these steps are performed consecutively.

The machine for forming these chaplets has a bed plate 30 which is supported by legs 31 securely bolted to the bed and which are adapted to rest upon a suitable support, not shown, such as for instance a floor. The bed plate 30 is provided with a central longitudinally extending opening 32 which has positioned therein a rotary disk 33 mounted upon a shaft 34, the ends of which are journaled in bearings suitably formed in or attached to the bed plate 30.

This rotary disk 33 is provided with equally spaced radially extending grooved slots 35 in which are mounted two part assembling clamps 36, the lower end 37 being rigidly mounted in the rotary disk 33 while the upper part 38 is radially slidable within the grooves of the slots 35. These assembling clamps 36 are of a length sufficient to extend slightly beyond the periphery of the rotary disk 33 when the lower part 37 and the upper part 38 of the clamps engage with each other.

Figure 2:
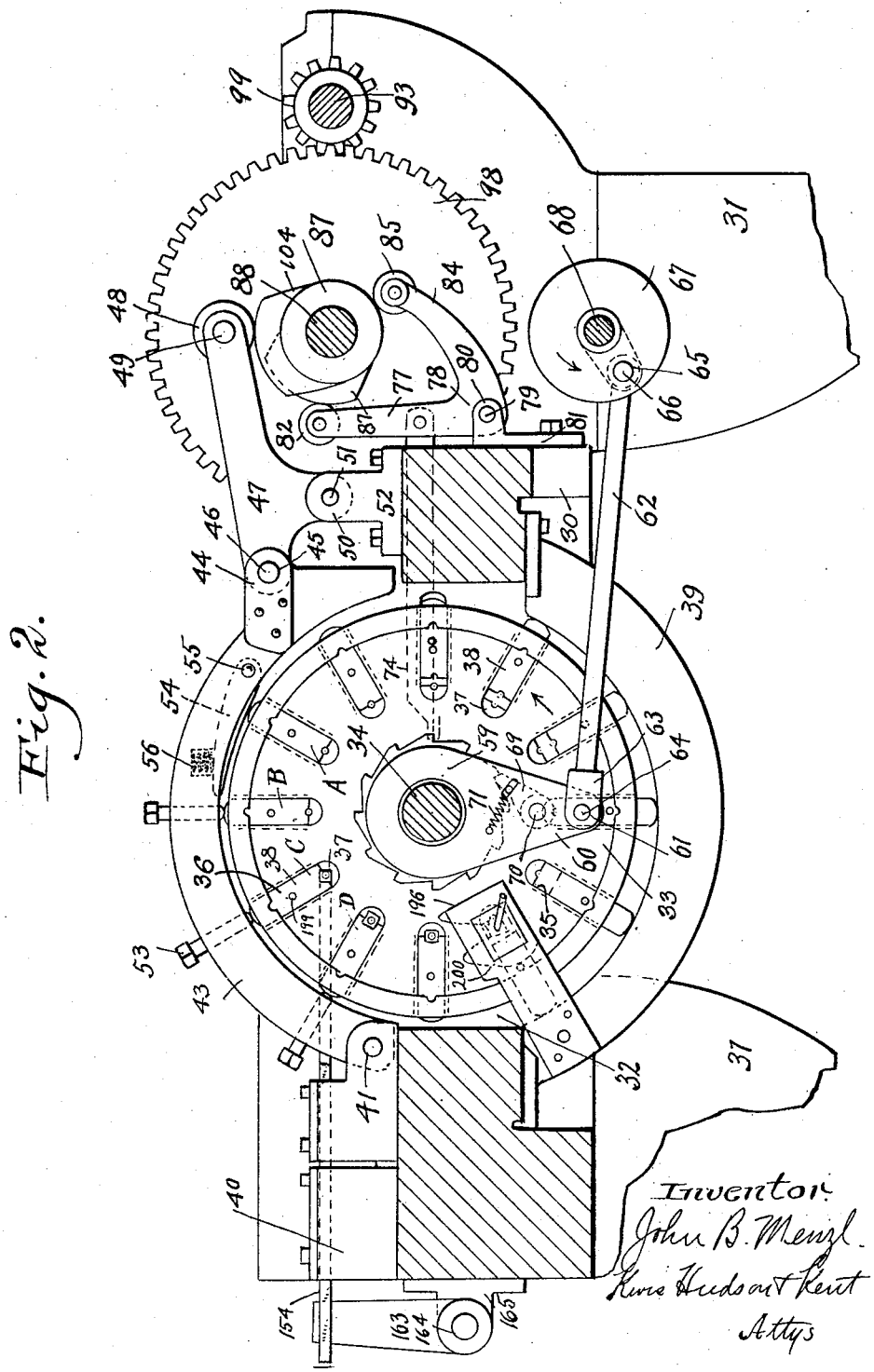
Fig. 2 is a sectional elevational view taken on line 2—2 of Fig. 1.
Figure 18:
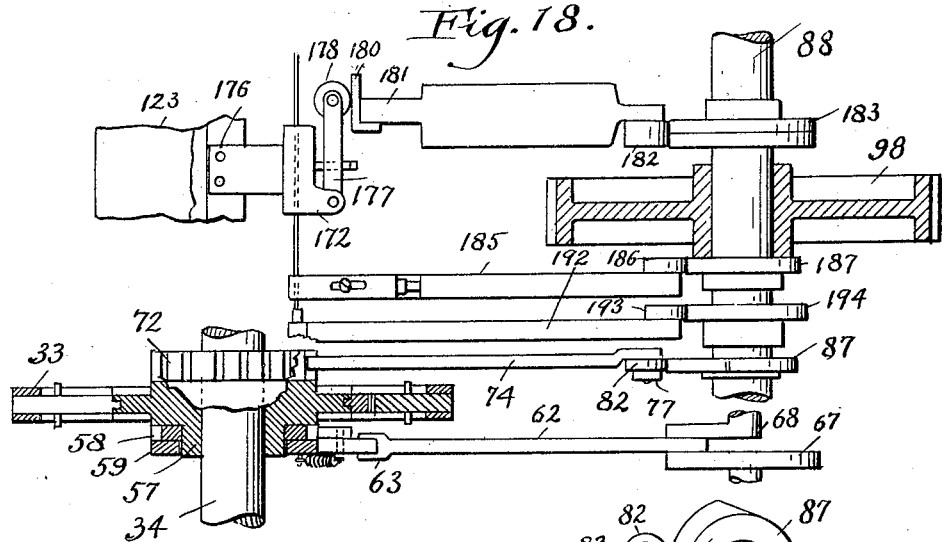
Fig. 18 is a distorted plan view partly in section showing the arrangement of the cams and the means for rotating the disk.
Figure 19:
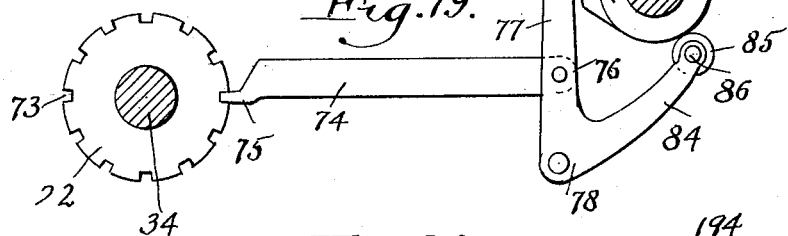
Fig. 19 is a view of the disk locking mechanism.
Figure 20:
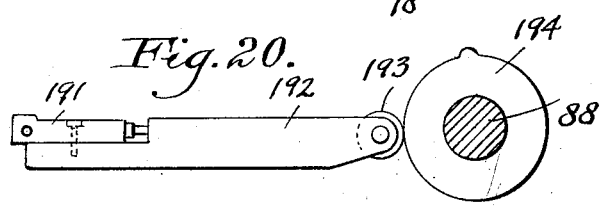
Fig. 20 is a view of the wire cut-off mechanism.
Figure 21:
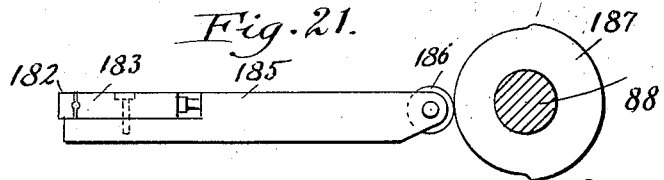
Fig. 21 is a view of the wire gripping mechanism.
Figure 22:
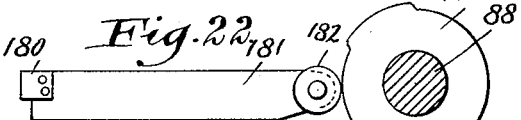
Fig. 22 is a view of the wire feeding cam and arm.

A cam arcuate member 39 is fastened by means of bolts to the under side of the bed plate 30 and bridges the opening 32 directly beneath the rotary disk 33. This cam member 39 acts as a rest or stop for the upper part 38 of the assembling clamps 36 when the upper part 38 drops due to gravity and at the same time, further acts to return the parts 37 and 38 of the assembling clamp 36 to substantially their engaging position, as is clearly shown in Fig. 2. Mounted at the rear upon the bed plate 30 and on the longitudinal center thereof is a block 40 which has formed at its inner end a bearing 41 provided with a centrally disposed slot 42 within which is pivotally mounted an arcuate arm 43 which is disposed directly above the rotary disk 33 and the opposite end of which is provided with an extension 44, which extension is secured by means of bolts or other suitable means, to the arm 43. This extension 44 is provided with a central opening 45 adapted to receive the pin 46 freely extending through one end of the lever 47 while the opposite end of the lever 47 has a roller 48 rotatably mounted on a shaft 49 extending through the lever. This lever 47 is provided with a downwardly extending arm 50 which is pivotally mounted at 51 to a bracket 52 bolted upon the upper surface of the bed plate 30. The arcuate arm 43 is provided with a plurality of adjustable bolts 53 which are screw threaded into suitable openings extending through the arcuate arm 43 directly above the assembling clamps 36, as shown in Fig. 2. These adjusting bolts 53 are adapted to engage the extending portions of the assembling clamps 36 when the arcuate arm 43 is lowered to thereby maintain the chaplet being formed, in rigid position and to prevent possible distortion of the stem. The proper adjustment of these adjusting bolts 53 depends upon the gauge of the wire being used to form the stem of the chaplet. It might here be stated, that the position of the adjusting bolts, as clearly shown in Fig. 2, corresponds to the steps in the method of upsetting the shoulders $b$ on the stem $a$, the assembling of the heads $c$ and the riveting of the heads to the stem *a*. This arrangement is for the purpose of securely holding the stem within the assembling clamps so that there is no possibility of the body of the stem crimping during the various operations. A cam 54 is pivotally mounted at 55 within a suitable groove formed in the under side of the arm 43 and is adapted to engage one of the assembling clamps 36 where the wire, forming the stem of the chaplet, is introduced. This cam 54 is held in engagement with the assembling clamp 36 by means of a spring 56 suitably disposed within an opening formed in the under side of the arm, as clearly shown in Fig. 2.

The rotary disk 33 is provide at its central portion with an extension 57 to which is securely fastened a ratchet wheel 58. Mounted for rotation upon the extension 57 and adjacent but independent of the ratchet wheel is a plate 59 having a depending portion 60 provided with an opening 61. A link 62, having a bifurcated end 63, is pivotally connected to the depending portion 60 of the plate 59 by means of a pin 64. The opposite end of the link 62 is provided with an eye 65 pivotally connected at 66 to the crank 67. A dog 69 is pivotally mounted at 70 to the depending portion 60 of the plate 59 and has its end extending into engagement with the teeth of the ratchet wheel 58 and normally maintained in engagement therewith, by a spring 71 which has one end connected to the dog 69 and the opposite end connected to the plate 59. It is here pointed out that the teeth of the ratchet wheel 58 are so disposed that rotation of the crank 67 in a counterclockwise direction will likewise cause the rotary disk 33 to also move in a counterclockwise direction, due to the engagement of the dog 69 with the ratchet wheel 58. The plate 59, however, being independently mounted with respect to the ratchet wheel 58, may be returned to its former position by clockwise rotation of the crank 67 without affecting the rotation of the disk 58.

As a means for preventing the rotation of the rotary disk 33 upon the return operation of the plate 59, there is fastened to the shaft 34 upon the opposite side of the rotary disk 33, a disk 72 provided with a plurality of equally spaced notches 73, the spacing of which corresponds with the spacing of the assembling clamps 36 of the rotary disk 33, and also with the radial shoulders of the ratchet wheel 58. A link 74 is slidably mounted within the bed plate 30 and has formed at its end an extension 75 which is adapted to fit within the notches 73 of the disk 72. The opposite end of the link 74 is pivotally connected at 76 to the arm 77 of the bell crank 78, this bell crank 78 being pivotally connected by a pin 79 to the extensions 80 of the bracket 81 which is fastened by bolts to the forward end of the bed plate. At the upper end of the arm 77 is a roller 82, which is mounted for rotation upon the pin 83. The arm 84 of the bell crank 78 has a roller 85 mounted for rotation upon a pin 86 which is secured in the arm 84. These rollers are spaced in such relation to be engaged by a cam 87 rotatably mounted upon the cam shaft 88, the rotation of which engages the rollers 82 and 85 and the lever 74 is thereby reciprocated into and out of engagement with the disk 72. The reciprocation of this lever 74 is so timed that when the extension 75 is disengaged from the notches 73 of the disk 72, the rotary disk 33 is in a position to be rotated in a counterclockwise direction by rotation of the crank 67. When the rotation of the crank 67 has carried the link 62 to its furthest position and has moved the rotary disk 33 one-twelfth of a revolution, as shown in Fig. 2, the offset on the cam 87 is just engaging the roller 82 of the bell crank 78 and further rotation causes the link 74 to be moved forward until the extension 75 is properly seated within the groove 73 of the disk 72.

The cam shaft 88 is rotatably mounted at its opposite ends within a pair of bearings 89, which are secured by bolts or other suitable means, to extensions 90 and 91$^a$ extending forwardly from the bed plate and either attached to or formed integral therewith. The ends of the cam shaft 88 extend beyond the outer edges of the bearings 89 and each end is provided with bevel gears 91 which mesh with bevel gears 91$^b$ secured to the ends of the transverse shafts 108. These extensions 90 and 91$^a$ have secured to their outer ends bearings 92 in which is rotatably mounted a drive shaft 93, which extends beyond one of the bearings 92 and is provided with a clutch operating mechanism 94 adapted to engage and disengage the clutch cone 95 from the cone 96 rigidly connected to the driving pulley 97. Movement of the cone clutch 95 outwardly by means of the clutch operating mechanism 94 stops the operation of the machine and the movement of cone clutch 95 into engagement with the cone 96 causes the machine to operate. The power for operating the machine may be supplied by a motor or other suitable means in which the driving wheel 97 is connected to the source of power and caused to rotate.

The cam shaft 88 has keyed thereto a gear 98, which is disposed between the bearings 89 and engages a pinion 99 keyed to the drive shaft 93. It should be understood that the ratio between this gear 98 and the pinion 99 should be of such a relation as to obtain the proper rotating speed to properly operate the cams so that the steps of the method in forming the chaplet are properly carried out.

Keyed to the cam shaft 88 between the bearing 89 and the gear 98 is a gear 100, which meshes with an idler 101 which in turn meshes with a gear 102 securely fastened to the shaft 68 upon which is mounted the crank 67 and causes rotation of the rotary disk 33. This idler 101 is rotatably mounted upon the arm of a bracket 103, the opposite end of which is secured to the base plate by means of bolts or other suitable means.

The cam shaft 88 has secured thereto and mounted for rotation therewith a cam 104, the extension of which is adapted to engage the roller 48 on the arm 47 secured to the arcuate arm 43. The extension upon the cam 104 is so arranged that upon rotation of the cam shaft 88 the extension will engage the roller 48 during the period of time in which the extension 75 of the lever 74 is in engagement with the notches 73 of the disk 72, and when the operation of forming the chaplet has been performed, the extension on the cam 104 is disengaged from the roller 48 due to further rotation of the cam shaft, which raises the arcuate arm 43 from engagement with the assembling clamps 36 of the rotary disks 33 and at the same time the cam 87 has left the roller 82 of the bell crank 78 and is engaging the roller 85, which acts to withdraw the extension 75 from engagement with the notches 73 of the disk 72. During the rotation of this cam shaft 88, as just described, the crank 67 has been rotated by gears 100, 101 and 102, and while the rotary disk 33 was in locked position, the plate 59 was being returned to its normal position with the dog 69 engaging a new tooth in the ratchet wheel 58 and as soon as the arcuate arm 43 was released from the rotary disk 33 and the extension 75 was disengaged from the notch 73 of the disk 72, the crank 67 was rotated counterclockwise until the rotary disk 33 had been moved to a new position, or as shown in Fig. 2 through a one-twelfth revolution.

The end of the drive shaft is further provided with a hand wheel 105 so that the machine may be adjusted for replacing new wire or metal tapes. The shaft 93 is supported in a bearing 106 between the driving pulley 97 and the hand wheel 105, secured to an arm 107 which is bolted to the bed plate 30.

Two parallel extending transverse shafts 108 are suitably mounted in bearings 109 and 110 secured to the bed plate 30, these shafts extending longitudinally of the machine near the outer ends and also parallel with the rotary disk 33. Each of these shafts are provided with an offset or eccentric 111 at their mid-portion which is rotatably mounted in a bearing 112. The bearing 112 has an inwardly extending arm 113 pivotally connected to the ears 114 of the slide 115.

This slide 115 is positioned between transverse guides 116 formed integral with the bed plate 30 and the inner ends terminate adjacent the rotary disk 33. The bed plate 30, between the guides 116, is machined and provided with a centrally extending shoulder 117 which engages a cooperating shoulder of the extension formed upon the bottom surface of the slide 115. These cooperating shoulders prevent the possibility of any side sway in the movement of the slide 115 between the guides 116.

Plates 118 are secured by bolts to the top edges of the guides 116 and overlap to some extent the slide 115 to prevent any possible upward movement of the slide.

The slide 115 has a slot 119 extending inwardly from the inner end and disposed within the slot is a punch holder 120 which is maintained in place by a bolt 121 in screw-threaded engagement therewith, the upper end of the bolt extending through an opening 122 in a cover plate 123, which is secured by bolts to the slide 115.

The punch holder 120 has a central bore 124 extending inwardly substantially past the center thereof which slidably receives a floating tape guide 125 provided with a head 126 at its extending end which may be formed intergral with the tape guide 125 as shown in Fig. 5, or may be separately formed and secured by bolts or other suitable means.

The floating tape guide 125 is prevented from rotation within the bore 124 by a key 127 secured to the head 126, which extends inwardly into sliding engagement within a key way 128 formed in the upper portion of the punch holder 120.

A transverse key 129 is secured in the cover plate 123 and the slide 115, and extends within an elongated recess 130 provided in the upper surface of the key 127. This recess 130 is considerably longer than the width of the key 129 and therefore determines the amount of longitudinal movement of the floating tape guide 125 independently of the slide 115.

Centrally of the bore 124 but at the opposite end is a screwthreaded opening 130ª which communicates with the bore 124 through a bore 131 of reduced diameter. A bore 132 extends centrally of the tape guide 125 and is of the same diameter and in alignment with the bore 131. Slidably disposed within the bores 131 and 132 is a punch 133, one end of which extends into the screw-threaded opening 130ª and adapted to be longitudinally adjusted by the adjusting bolt 134 mounted within the opening. A locknut 135 through which the bolt 134 extends, can be turned into engagement with the end of the punch holder 120 to thereby lock the bolt against movement. However, when the punch has been adjusted longitudinally to the position desired, the bolt 121 is adapted to engage a flattened surface 136 on the punch 133 and thereby lock the punch in the adjusted position. The forward end of the punch 133 has a squared portion which extends into an opening of corresponding shape in the head 126. The punch 133 has a central bore extending inwardly into communication with a recess 137 formed in the outer surface of the punch 133 and this recess aligns with apertures 138 in the tape guide 125; 139 in the punch holder 120; 140 in the slide 115, and 141 in the bed plate 30, so that when the heads c of the chaplet are punched by the stem the slugs are discharged through these apertures into a suitable receptacle, not shown.

The head 126 has a die plate 142 provided with a squared opening 143 corresponding to the size of the heads c of the chaplet, which is in alignment with the squared opening in the head and is secured by bolts to the head. The head is provided with a transverse grove 144 extending from the opening to the outer edge of the head 126 which is adapted to receive the metal tape from which the heads c of the chaplet are formed, and is held within the head by the die plate 142.

The slide 115 also carries upon its outer face and positioned to align with the assembling clamps 36, dies 145 and 146 which are adapted to form the shoulders b and rivet the heads c to the stem a of the chaplet respectively.

It should here be stated that there is a right and left-hand slide 115 and its associated parts, which are disposed directly opposite to each other and on opposite sides of the rotary disk 33, the operating mechanism therefore being timed so that the dies act together to form the shoulder b on each end of the stem a, cut and pierce the heads c and position them upon the stem and rivet the heads to the stem simultaneously but in successive steps.

Any means for feeding the tape from which the heads c of the chaplet are formed may be employed so long as this tape is fed simultaneously on both sides of the disk 33 and advanced intermittently with respect to the cycle of operations. However, I here provide a pair of grooves 147 and 148 in the upper face of the block 40, the outer groove 148 being of a greater width. In this larger groove is mounted a slide 149 which is provided with a groove 150, the inner edges of this latter groove aligning with the inner edges of the groove 147. Secured to the inner edges of each of the grooves 147 and 150 are hardened metal liners or strips 151 and 152, the liners on each side having aligned recesses 153 slightly larger than the metal tape 154 and in which the tape is permitted to slide. The slide 149 has mounted thereon between the two metal tapes, a pair of spring pressed gripping members 155, one of which engages the tape on one side while the opposite one engages the tape on the opposite side on the advance movement of the slide 149, but which freely slide over the tape on the return movement of the slide. Mounted upon the bottom of the groove 147 and between the tapes is also a gripping mechanism which acts just opposite to the gripping members 155, that is, upon the advance movement of the slide 149 and at which time the gripping members 155 are engaging the tapes, the tapes are permitted to slide past the second gripping means, but upon the return of the slide 149, during which movement the gripping members 155 do not grip the tapes, the second gripping mechanism will engage and hold the tapes against movement. I here preferably provide, as the second gripping mechanism, a tapered block 156 secured to the bottom of the groove 147 between the tapes, which is provided with a central opening through which slidably extends a stem 157 having an arcuate head 158. Rollers 159 are loosely disposed between the tapered block 156 and the tapes, and are maintained in position by the arcuate head 158 which is held in normal engagement therewith by spring 160 coiled around the stem 157 which engages the block 156 and a washer mounted upon the stem. As the tapes are advanced by the gripping members 155, the rollers 159 are moved along the tapered surfaces of the block 156 which permits the tapes to slide freely past the rollers, but upon the return movement of the gripping members 155, the rollers 159 are wedged between the tapered surfaces of the block 156 thereby preventing backward movement of the tapes.

To obtain the proper advancement of the metal tapes 154 with respect to the movement of the slides 115, a bolt 161 is secured by a pin 162 to the slide 149 and the opposite end is attached by nuts to the arm 163 which has its lower end secured to a transverse rod 164 pivotally mounted in a bracket 165 attached by bolts to the bed plate 30. The opposite end of the rod 164 is mounted in a bracket 166 secured to the bed plate 30, and upon the end of the rod extending beyond the bracket 166 is an upwardly extending arm 167 having a roller 168 attached to the upper end. This roller travels in a screw slot 169 formed in a sleeve 170 which is keyed or otherwise secured to the shaft 108 to which the slide 115 is attached. This sleeve 170 is adjusted so that upon the inward movement of the slide 115, the slide 149 carrying the gripping member 155 is being moved rearwardly or is making its return, and upon the outward movement of the slide 115, the gripping members 155 are moving the metal tapes forwardly. The metal tapes may be supplied continuously from rolls aside from the machine or means may be provided in the machine for mounting the rolls of metal tape thereon.

Referring particularly to Fig. 10 there is here shown the preferred mechanism for feeding the wire to the rotary disk 33, the cutting means and the means for gripping the wire while being cut.

The wire 171 is fed from a roll, not shown, through an opening 172 formed by the engagement of a pair of plates 173 and 174 secured together by bolts or other suitable means. Disposed within cooperating recesses formed upon the inner faces of the plates is a hardened metal guide 175 which has a central opening of the same size and aligning with the opening 172 thereby forming a continuous passage for the wire. Plate 174 has an extension 176 formed integrally therewith or joined in any suitable manner, to the cover 123 of the slide 115 so that these parts are adapted to reciprocate together. On the inner central portion of the plate 173 there is pivotally mounted an arm 177 which extends rearwardly and is provided at its free ends with a roller 178. Interposed midway of the arm 177 is an adjusting bolt 179 adjustably mounted therein which has its inner end in engagement with the guide 175 and adapted to regulate the tension or grip upon the wire 171.

The roller 178 engages with a plate 180 secured to the end of a sliding rod 181 mounted in the bed plate 30 and a roller 182 attached to the opposite end of the rod is adapted to be engaged by the cam 183 keyed or otherwise secured to the cam shaft 88, the cam forcing the rod into engagement with the roller 178 to cause the wire to be gripped and moved forward as the slide 115 is moved inwardly, and releasing its pressure on the roller 178 as the slide 115 is moved outwardly thereby permitting the guide 175 to freely slip along the wire.

The wire 171 as it is fed forwardly, extends through an opening in a pair of cooperating gripping members 182 and 183, the member 182 being secured to the machined block 184 bolted to the bed plate 30 while the member 183 is adjustably mounted on a slide 185 carried by the block 184. The opposite end of the slide 185 is provided with a roller 186 which is engaged by a cam 187 keyed or otherwise secured to the cam shaft 88. The operation of this gripping mechanism is timed so that the wire 171 is gripped and held against movement while the feeding device is moving rearwardly and releases its grip on the wire as the feeding device grips the wire and moves it inwardly toward the disk 33.

While the gripping mechanism is functioning to prevent the wire from being moved, the wire extends through hardened metal tubes 188 and 189, the tube 189 being rigidly fixed within a block 190 attached to the block 184, while the tube 188 is secured to a member 191 adjustably mounted on the slide 192 carried by the block 184. A roller 193 is adapted to be engaged by a cam 194 keyed or otherwise secured to the cam shaft 88 and the mechanism is so timed that while the gripping mechanism is in engagement with the wire to thereby prevent movement, the slide 192 is moved forward by the cam 194 and the wire is cut by the shearing action of the tubes 188 and 189. It should be noted that the tube 189 is considerably longer than the tube 188 and this is for the purpose of holding two cut stems $a$ in reserve at all times however, this number may be changed if desired. The feeding of the wire also acts to feed one of the cut stems $a$ into the opening in one of the assembling clamps, the one designated A for convenience as clearly shown in Fig. 10 and Fig. 2. The cut stems $a$ are usually forced through the assembling clamps 36 too far and are not centrally positioned and therefore a centering device is provided which comprises a block 195 bolted to the bed plate 30 which has adjustably mounted therein a rod 196$^a$, the forward end being bent in the direction of rotation of the disk 33 and extending inwardly so as to be engaged by the stems $a$ as the disk rotates which centrally positions the stems within the disk.

After the chaplets have been formed by the above described machine it is important to remove them from the machine into a suitable receptacle and this, of course, should be automatically performed without interruption in the operation and efficiency of the machine.

I, therefore, preferably provide a pair of plates 196 which are bolted to each side of the cam member 39 and extend inwardly on each side of the rotary disk 33. Each of these plates has attached to its inner face a pair of cam plates 197 provided with a chaplet head receiving recess 198, one of said recesses extending entirely through the plate while the opposite recess stops short of the lower end of the plate. An air line, attached to a suitable air supply not shown, has its opposite end secured to plate 197 and communicates with the lower portion of the slot which stops short of the bottom of the plate. As the disk 33 is rotated past the plates 196, the pin 199, carried by the sliding member 38 of the assembling clamps 36, engages the cam surface 200 and is disengaged from the chaplet, which chaplet at the same time engages the cam surface of the recess 198 and is thereby disengaged from the lower member 37 of the assembling clamps 36. This positions the chaplet centrally of the opening 201 and the air blows the chaplet therethrough into any suitable receptacle.

Briefly describing the operation of the machine in forming the chaplets, I will designate for convenience, four of the assembling clamps A, B, C and D as shown in Fig. 2, it being understood that different chaplets are being acted upon simultaneously while the clamps are in these indicated positions.

The first step in the method, however, is the feeding of the stem $a$ into the opening in the assembling clamp A. This is accomplished as indicated in Fig. 10 and it should here be pointed out that during each step in the forming of the chaplet the rotary disk 33 is locked against movement and as each step is completed the rotary disk is automatically advanced one-twelfth revolution to a position adjacent the mechanism which forms the next step and so on throughout the various steps.

As the disk is rotated to the position adjacent the shouldering dies 145, a new stem $a$ has been cut off and the feeding mechanism has moved rearwardly, gripped the wire 171 and again moved the wire forward which forces the outermost stem $a$ into the opening in the assembling clamp designated in position A. But during this operation the slides 115 on each side of the rotary disk 33 have been moved inwardly, the cam 43 has brought the bolt 53 into engagement with the clamp B and the dies 145 have formed the shoulders $b$ on each end of the stem $a$.

The cam 43 is then released and the rotary disk 33 advanced to the position indicated by C. The cam 43 again brings the bolt 53 into engagement with the assembling clamp C to prevent the stem from crimping at a position adjacent the mechanism for forming and punching the heads $c$. The metal tapes of course are fed into the tape guide 125 intermittently with respect to the operation of the slides 115, so that when the slides are being moved inwardly the tape feeding mechanism is moving outwardly and as the slides are moved outwardly the tape feeding mechanism is feeding the tapes into the tape guide 125. As the slide 115 moves inwardly the die plate 126 engages the rotary disk 33 and is prevented from further movement but the slide has a slightly further movement causing the punch 133 to cut the head $c$ from the tape and at the same time piercing the head by the engagement of the extension of the stem with the cut head $c$. As the slide 115 returns the head 126 engages the stop before the slide reaches its extreme rearward position, and upon further rearward movement the punch 133 is brought past the opening 144 so that the metal tapes can be freely advanced into the opening 143.

During the rearward stroke of the slide 115, the rotary disk has been advanced to the position indicated at D which is adjacent the dies 146 on the slide. While the disk is locked in this position the slide 115 again is moved inwardly and the dies 146 upset the extensions of the stem $a$ beyond the heads $c$ and securely rivet them to the stem against the shoulders.

I have described above the so-called cycle of operations for forming a single chaplet but it should, of course, be understood that while these operations take place successively they are also taking place simultaneously upon different stems.

As the disk is further rotated, step by step, the finished chaplet is finally engaged by cam 197 which frees the chaplet from the assembling clamp and finally the air blows the chaplet from the recess in the cam into a suitable receptacle.

Having thus described my invention, what I claim is:

1. In a machine for securing the heads to the stems of metallic retaining members, a rotary disk adapted to receive stems in a horizontal position, means for rotating said disk step by step, means for upsetting shoulders adjacent both ends of said stems, means for supplying heads adjacent the ends of said stems, means for piercing said heads and positioning them on the stems, and means for riveting the heads to the stems against said shoulders.

2. In a machine for securing the heads to the stems of metallic retaining members, a rotary disk provided with a plurality of equally spaced assembling clamps adapted to receive stems in a horizontal position, means for continuously feeding wire towards said disk, means for severing stems from said wire, as they are fed to said clamps, means for rotating said disk intermittently as said stems are fed to said clamps, means for locking said stems in said clamps, and means adapted to operate simultaneously on opposite ends of said stems and successively forming shoulders on said stems, supplying heads to said stems and riveting the said heads to the stems against the shoulders while said stems are in locked position.

3. In a machine for securing the heads to the stems of metallic retaining members, a rotary disk provided with means for supporting a stem, means for feeding stems to said supporting means, means for forming shoulders adjacent the ends of said stem, means for positioning a head on each end of said stem, means for riveting said heads to said stem against said shoulders, means for disengaging said members from said disk, and means for intermittently rotating said disk between each operation.

4. In a machine for securing the heads to the stems of metallic retaining members, a rotary disk provided with means for supporting a stem, means for feeding stems to said supporting means, means for forming shoulders adjacent the ends of said stem, means for positioning a head on each end of said stem, means for riveting said heads to said stem against said shoulders, means for intermittently rotating said disk between each operation, means for disengaging said members from said disk, and means for pneumatically ejecting said members from the latter.

5. In a machine for securing the heads to the stems of metallic retaining members, a disk provided with stem supporting members, means for rotating said disk step by step, means for locking said disk against rotation during its period of rest, means for feeding a stem to one of said supporting members while said disk is locked, means for locking said stems within said supporting members while said disk is locked, and means for simultaneously performing the operations of providing shoulders on a stem, positioning heads on another stem, and riveting the heads against the shoulders of still another stem while the said disk is locked against rotation.

6. In a machine for securing the heads to the stems of metallic retaining members, a disk adapted to receive a plurality of stems, means for periodically rotating said disk, means for supplying stems to said disk, means for feeding continuous metal tapes on each side of said disk, and oppositely disposed means for successively forming shoulders on said stems, severing the tapes to form heads and piercing the same with said stems, and riveting said heads to said stems, said oppositely disposed means being adapted to perform simultaneously one of each of the successive operations.

7. In a machine of the type described, a support, a rotatable disk mounted on said support and provided with stem supporting members, means for feeding stems one at a time to said members, means for rotating said disk after each stem has been fed thereto, means for supplying heads a pair at a time for said stems, and oppositely disposed dies slidably mounted on said support for performing successively the operations of upsetting shoulders on a stem, piercing and positioning heads upon said stem, and riveting said heads to said stem, said dies being adapted to perform simultaneously one of each of said operations upon the stems carried by said disk.

8. In a machine for securing the heads to the stems of metallic retaining members, a bed plate, a rotatable disk adapted to support a plurality of stems, means for supplying stems to said disk, a pair of oppositely disposed dies slidably mounted on said bed plate and adapted to be moved into engagement with the stems in said disk, to simultaneously perform the steps on successive stems, of upsetting shoulders adjacent the ends, piercing and positioning the heads, and riveting the heads against the shoulders.

9. In a machine for securing the heads to the stems of metallic retaining members, a bed plate, a vertically disposed disk rotatably mounted on said bed plate and adapted to support a plurality of stems, means for feeding stems to said disk, means for rotating said disk as each stem is fed thereto, a pair of oppositely disposed dies slidably mounted on said bed plate at right angles to said disk, means for feeding heads to said dies, and means for locking said disk as the dies are moved into engagement with the stems, said dies being adapted to simultaneously perform upon successive stems the steps of upsetting shoulders on one stem, piercing and positioning heads on a second stem and finally riveting the heads to a third stem against the shoulders.

10. In a multiple die of the character described, a slide provided with a recess, a block secured within said recess and having a central opening therein, a punch disposed within said opening and secured to said block, and a tubular member disposed within said central opening and surrounding said punch, said member being adapted for movement independently of said slide.

11. In a multiple die of the character described, a slide provided with a recess, a block secured within said recess and having a central opening therein, a punch disposed within said opening and secured to said block, means for adjusting said punch, and a tubular member disposed within said central opening and surrounding said punch, said member being adapted for movement independently of said slide.

12. In a multiple die of the character described, a slide provided with a recess, a block secured within said recess and having a central opening therein, a punch disposed within said opening and secured to said block, a discharge opening in said punch, a tubular member disposed within said central opening and surrounding said punch, the said discharge opening communicating with openings in said tubular member, block and slide.

In testimony whereof, I hereunto affix my signature.

JOHN B. MENZL.